United States Patent
Kiyohara et al.

(10) Patent No.: US 12,473,129 B2
(45) Date of Patent: Nov. 18, 2025

(54) FILM-WRAPPED TYPE HOT MELT ADHESIVE

(71) Applicant: HENKEL AG & CO. KGAA, Duesseldorf (DE)

(72) Inventors: Takeshi Kiyohara, Osaka (JP); Shigekazu Saito, Osaka (JP); Takanori Okuda, Osaka (JP)

(73) Assignee: HENKEL AG & CO. KGaA, Duesseldorf (DE)

( * ) Notice: Subject to any disclaimer, the term of this patent is extended or adjusted under 35 U.S.C. 154(b) by 396 days.

(21) Appl. No.: 16/900,353

(22) Filed: Jun. 12, 2020

(65) Prior Publication Data

US 2020/0307880 A1 Oct. 1, 2020

Related U.S. Application Data

(63) Continuation of application No. PCT/JP2018/044857, filed on Dec. 6, 2018.

(30) Foreign Application Priority Data

Dec. 18, 2017 (JP) .................................. 2017-241611

(51) Int. Cl.
| | |
|---|---|
| B65D 65/38 | (2006.01) |
| B65B 3/04 | (2006.01) |
| B65B 25/06 | (2006.01) |
| B65B 63/08 | (2006.01) |
| C08L 23/06 | (2006.01) |
| C09J 5/06 | (2006.01) |
| C09J 7/24 | (2018.01) |
| C09J 9/00 | (2006.01) |

(52) U.S. Cl.
CPC ............... *B65D 65/38* (2013.01); *B65B 3/04* (2013.01); *B65B 63/08* (2013.01); *C08L 23/06* (2013.01); *C09J 5/06* (2013.01); *C09J 7/241* (2018.01); *C09J 7/245* (2018.01); *C09J 9/00* (2013.01); *B65B 25/06* (2013.01); *C08L 2203/16* (2013.01); *C08L 2205/02* (2013.01); *C08L 2205/025* (2013.01); *C08L 2207/06* (2013.01); *C08L 2314/02* (2013.01); *C08L 2314/06* (2013.01)

(58) Field of Classification Search
CPC ........... B32B 3/26; B32B 3/30; B32B 27/327; B32B 25/06; C08L 23/04; C08L 23/06; C08J 5/18
USPC ............................................... 428/34.1–36.92
See application file for complete search history.

(56) References Cited

U.S. PATENT DOCUMENTS

| | | | | |
|---|---|---|---|---|
| 2,791,326 A * | 5/1957 | Sparks | ................... | B65D 25/16 206/524.7 |
| 4,069,359 A * | 1/1978 | DeMarse | ............ | B29C 37/0075 242/444 |
| 4,986,496 A * | 1/1991 | Marentic | ................... | B05D 5/02 428/167 |
| 5,257,491 A * | 11/1993 | Rouyer | ................ | B65D 65/466 53/436 |
| 5,392,592 A * | 2/1995 | Bozich | ................... | B65D 65/42 206/524.1 |
| 5,972,473 A * | 10/1999 | Arakawa | ................ | B65D 65/38 28/220 |
| 6,076,674 A * | 6/2000 | Christ | ..................... | B65B 63/08 206/412 |
| 6,138,441 A * | 10/2000 | Kik | ........................... | B65B 9/20 53/551 |
| 6,155,029 A * | 12/2000 | Jain | ......................... | B65B 9/067 53/550 |
| 6,315,851 B1* | 11/2001 | Mazurek | .................. | C09J 7/381 156/289 |
| 7,328,547 B2* | 2/2008 | Mehta | ..................... | C08L 23/04 524/480 |
| 2002/0058127 A1* | 5/2002 | Itada | .......................... | C09J 7/22 428/141 |
| 2003/0155261 A1* | 8/2003 | Paul | ........................ | B65B 63/08 206/447 |
| 2004/0074800 A1* | 4/2004 | Harwell | .................. | B65D 65/40 206/484 |
| 2004/0119198 A1* | 6/2004 | Alper | ...................... | B65B 63/08 264/237 |
| 2006/0075723 A1* | 4/2006 | Burriez | ............... | B29C 66/0244 53/550 |

(Continued)

FOREIGN PATENT DOCUMENTS

| | | | | |
|---|---|---|---|---|
| CN | 2498075 Y | 7/2002 | | |
| CN | 1450971 A | 10/2003 | | |
| CN | 100556766 C | 2/2006 | | |
| CN | 101554932 A | 10/2009 | | |
| CN | 104334618 A | 2/2015 | | |
| FR | 2753715 A1 * | 3/1998 | ......... | B29C 37/0075 |
| JP | 2003104436 A | 4/2003 | | |

(Continued)

OTHER PUBLICATIONS

A. Prasad, "A Quantitative Analysis of Low Density Polyethylene and Linear Low Density Polyethylene Blends by Differential Scanning Calorimetry and Fourier Transform Infrared Spectroscopy Methods", Polymer Engineering and Science, Oct. 1996, vol. 38, No. 10, pp. 1716-1728 (Year: 1996).*

*Primary Examiner* — Michael C Romanowski

(74) *Attorney, Agent, or Firm* — Sun Hee Thomas

(57) ABSTRACT

Disclosed is a film-wrapped type hot melt adhesive, comprising: a film made from a thermoplastic resin composition and a hot melt adhesive wrapped by the film, wherein the thermoplastic resin composition comprises an ethylene homopolymer, and a concavo-convex is formed on a surface of the film. The film-wrapped type hot melt adhesive has blocking resistance and thermal stability which are improved in a balanced manner.

5 Claims, No Drawings

(56) References Cited

U.S. PATENT DOCUMENTS

| | | | |
|---|---|---|---|
| 2010/0233439 A1* | 9/2010 | Stone | B29C 66/1122 428/174 |
| 2011/0247304 A1* | 10/2011 | Kaldenhoff | B65B 63/08 53/428 |
| 2013/0165568 A1* | 6/2013 | Goubard | B65B 63/08 524/505 |
| 2013/0309427 A1 | 11/2013 | Jinyu et al. | |
| 2014/0302281 A1* | 10/2014 | Yacovone | B32B 17/10577 428/141 |

FOREIGN PATENT DOCUMENTS

| | | | |
|---|---|---|---|
| JP | 2003-171646 * | 6/2003 | C09J 201/00 |
| JP | 2005219818 A | 8/2005 | |
| JP | 2006-503766 A | 2/2006 | |
| JP | 2014-518789 A | 8/2014 | |
| JP | 2014177284 A | 9/2014 | |
| JP | 2015-524008 A | 8/2015 | |
| WO | 97/25256 A1 | 7/1997 | |
| WO | 9842792 | 10/1998 | |
| WO | WO-0009401 A2 * | 2/2000 | B65B 3/022 |
| WO | WO-0034129 A1 * | 6/2000 | B65B 63/08 |
| WO | 2004/037671 A1 | 5/2004 | |
| WO | WO-2005047387 A1 * | 5/2005 | C08J 5/18 |
| WO | 2014/194087 A2 | 12/2014 | |

\* cited by examiner

FILM-WRAPPED TYPE HOT MELT ADHESIVE

FIELD OF THE INVENTION

The present invention relates to a film-wrapped type hot melt adhesive which is wrapped by a film made from a thermoplastic resin composition.

BACKGROUND OF THE INVENTION

A hot melt adhesive is a solventless adhesive. It is heated and melted (or molten) to be coated on an adherend, and then cooled and solidified to exert adhesiveness, and used in a wide range of fields such as paper processing, woodworking, hygiene materials (or sanitary materials), and electronic field. Generally, the hot melt adhesive is a solid at room temperature and supplied in a form of a block. When the hot melt adhesive in a form of a block is supplied, the solid hot melt adhesive is wrapped by a plastic film and can be supplied as a "film-packaged type hot melt adhesive" (or "film-wrapped type hot melt adhesive") in order to prevent fixation of plural blocks each other. JP 2004-518789 A, JP 2006-503766 A, and JP 2015-524008 A disclose a film-wrapped type hot melt adhesive which is wrapped by an olefin-based film.

JP 2004-518789 A discloses a film-wrapped type hot melt adhesive which is wrapped by a film made from a thermoplastic resin composition with a melting point of less than 100° C. (hereinafter also referred to as "thermoplastic film") (see [Claim 1] of JP 2004-518789 A). JP 2004-518789 A exemplifies ethylene-methyl acrylate and ethylene-vinyl acetate as components of the thermoplastic film (see [Claim 3] to [Claim 6] of JP 2004-518789 A).

JP 2006-503766 A discloses a film-wrapped type hot melt adhesive which is wrapped by a thermoplastic film, which is a multilayer film (see [Claim 1] of JP 2006-503766 A). JP 2006-503766 A discloses a two-layer film and a three-layer film comprising a layer of ethylene-vinyl acetate (EVA) as samples 1 and 2 in Table 1 of Examples.

JP 2015-524008 A discloses a film-wrapped type hot melt adhesive which is wrapped by a thermoplastic film produced from a polymer blend with a propylene content of 70 wt % or more (see [Claim 1] and [Table 1] to [Table 4] of JP 2015-524008 A). The thermoplastic film of JP 2015-524008 A comprises a propylene polymer obtained by polymerization using a metallocene catalyst (see [Claim 3] and [Table 1] to [Table 4] of JP 2015-524008 A).

SUMMARY OF THE INVENTION

Problems to be Solved by the Invention

In JP 2004-518789 A, JP 2006-503766 A, and JP 2015-524008 A, a hot melt adhesive is wrapped by a thermoplastic film, so as to prevent plural blocks of the hot melt adhesive from fixing each other. However, when a large amount of blocks of the hot melt adhesive are carried and/or stored, even if the thermoplastic films of JP 2004-518789 A, JP 2006-503766 A, and JP 2015-524008 A are used, the thermoplastic films may be fixed each other, and thus it is difficult to prevent the wrapped blocks from fixing each other.

Furthermore, when used, a hot melt adhesive is melted in a tank, while being wrapped by a thermoplastic film, to be adjusted to a viscosity at which the hot melt adhesive is easily applied to a substrate. However, after the hot melt adhesive in the tank is applied to a substrate, melted materials of the thermoplastic film sometimes remain in the tank. In this case, it is necessary to wash the inside of the tank to remove the residues of the thermoplastic film.

Furthermore, a part of the thermoplastic film of JP 2004-518789 A, JP 2006-503766 A, and JP 2015-524008 A sometimes remains as a discolored degraded material. The residue of the thermoplastic film may adversely affect a coater of the hot melt adhesive, spoil the beauty (or appearance) of the adhesive, or cause decrease in adhesive strength.

Recently, demands of users on performance and workability of hot melt adhesives have been increased. It cannot be said that the film-wrapped type hot melt adhesives disclosed in JP 2004-518789 A, JP 2006-503766 A, and JP 2015-524008 A meet the demands of the users at a high level.

It is desired that a thermoplastic film which wraps a hot melt adhesive is excellent in balance between blocking resistance and thermal stability, it is not degraded in a melted hot melt adhesive, and does not remain in a tank.

The present invention was made in order to solve the above problems. It is an object of the present invention to provide a film-wrapped type hot melt adhesive which is wrapped by a thermoplastic film excellent in balance between blocking resistance and thermal stability.

Means for Solving the Problems

The present inventors have intensively studied and found that each performance of a thermoplastic film, such as blocking resistance and thermal stability, can be improved in a balanced manner by roughening the outer surface of the thermoplastic film which wraps a hot melt adhesive and by containing a specific polymer as a main component in the thermoplastic film, thus the present invention was completed.

In an aspect, the present invention provides a novel film-wrapped type hot melt adhesive, comprising:
  a film made from a thermoplastic resin composition and a hot melt adhesive wrapped by the film, wherein
  the thermoplastic resin composition comprises an ethylene homopolymer, and
  a concavo-convex is formed on an outer surface of the film.

In an embodiment, the present invention provides a film-wrapped type hot melt adhesive, wherein the concavo-convex is formed by embossing.

In another embodiment, the present invention provides a film-wrapped type hot melt adhesive, wherein the ethylene homopolymer has a melting point of 70 to 120° C.

In a preferred embodiment, the present invention provides a film-wrapped type hot melt adhesive, wherein the thermoplastic resin composition further comprises one or more other polymers.

In a further embodiment, the present invention provides a film-wrapped type hot melt adhesive, wherein the one or more other polymers comprise an ethylene-based copolymer.

In another preferred embodiment, the present invention provides a film-wrapped type hot melt adhesive, wherein the blended amount of the ethylene homopolymer is 50 to 100 parts by weight, based on 100 parts by weight of the total of the ethylene homopolymer and the one or more other polymers.

Effects of the Invention

In a film-wrapped type hot melt adhesive comprising a thermoplastic film made from a thermoplastic resin composition and a hot melt adhesive wrapped by the film according to an embodiment of the present invention, the thermoplastic film has an ethylene homopolymer and a concavo-convex is formed on an outer surface.

The film-wrapped type hot melt adhesive exists in a form of a block wrapped by the thermoplastic film (hereinafter also referred to as "film-wrapped type block"), and is carried and/or stored in a state where plural film-wrapped type blocks are brought into contact each other.

The convex-concave on the surface of the thermoplastic film decreases the area of contact between thermoplastic films, and reduces the adhesive force between the thermoplastic films which were brought into contact. Therefore, the film-wrapped type hot melt adhesive according to an embodiment of the present invention is excellent in blocking resistance, making an operator easily handle a large amount of film-wrapped type hot melt adhesive blocks.

Furthermore, improvement in thermal stability of the thermoplastic film decreases (preferably eliminates) the unmelted residue of the film in the hot melt adhesive, and reduces the possibilities of clogging of an adhesive coater, spoiling of beauty (or appearance) of the adhesive, and decrease in adhesive strength.

Therefore, the hot melt adhesive according to the present invention becomes excellent in balance between blocking resistance and thermal stability.

DESCRIPTION OF THE EMBODIMENTS

In a film-wrapped type hot melt adhesive of an embodiment of the present invention, a hot melt adhesive is wrapped by a thermoplastic film made from a thermoplastic resin composition. The thermoplastic film comprises an ethylene homopolymer as a component, and a concavo-convex (concavo-convex part or concavo-convex pattern) is formed on an outer surface.

<Hot Melt Adhesive>

As used herein, the "hot melt adhesive" means an adhesive which is generally called hot melt adhesive, and is not particularly limited as long as the objective film-wrapped type hot melt adhesive according to the present invention can be obtained.

Specific examples of the hot melt adhesive include
an olefin-based hot melt adhesive produced from amorphous polyolefin, polyethylene, polypropylene, polybutene, and a copolymer thereof;
an ethylene-based hot melt adhesive produced from a copolymer of ethylene and non-olefin, for example, an ethylene-vinyl acetate copolymer and an ethylene-methylmethacrylate copolymer; and
a hot melt adhesive based on a thermoplastic block copolymer, which is a copolymer of vinyl-based aromatic hydrocarbon and a conjugated diene compound, for example, a styrene-based block copolymer such as a styrene-butadiene-based block copolymer and a styrene-isoprene-based block copolymer. The hot melt adhesive according to the present specification is not limited to the above examples.

As used herein, the terms "wrapped", "package", and "packaging" are interchangeably used, and mean that a block of the hot melt adhesive is wrapped in a layer of a film. The film is a non-adhesive or non-blocking layer, and further protects the adhesive from contamination and acts so that an operator can easily perform handling such as carrying and/or storage.

The hot melt adhesive according to the present specification preferably comprises a tackifier resin, a wax, a plasticizer, and other additives appropriately.

The tackifier resin is not particularly limited as long as the tackifier resin is commonly used in hot melt adhesives and the objective film-wrapped type hot melt adhesive according to the present invention can be obtained.

The wax is not particularly limited as long as the wax is commonly used in hot melt adhesives and the objective film-wrapped type hot melt adhesive according to the present invention can be obtained.

Specific examples of the wax include a synthetic wax such as a Fischer-Tropsch wax and a polyolefin wax (for example, a polyethylene wax, a polypropylene wax);
a petroleum wax such as a paraffin wax and a microcrystalline wax;
a natural wax such as a caster wax.
If a polar group can be introduced into the above waxes, various carboxylic acid derivative waxes may be used.

The plasticizer is blended for the purpose of decreasing melt viscosity of the hot melt adhesive, imparting flexibility, and improving wettability to an adherend, and is not particularly limited as long as the plasticizer is compatible with components of the hot melt adhesive and the objective film-wrapped type hot melt adhesive according to the present invention can be obtained.

Examples of the plasticizer include a paraffin-based oil, a naphthene-based oil, and an aromatic-based oil.

Examples of other additives include a stabilizer and a fine particle filler.

The "stabilizer" is blended so as to prevent decrease in molecular weight and occurrence of gelation, coloration, odor and the like of hot melt adhesives due to heat, thereby improving stability of the hot melt adhesives, and is not particularly limited as long as the objective film-wrapped type hot melt adhesive according to the present invention can be obtained. Examples of the "stabilizer" include an antioxidant and an ultraviolet absorber.

The "ultraviolet absorber" is used so as to improve light resistance of hot melt adhesives.

The "antioxidant" is used so as to prevent oxidative degradation of hot melt adhesives.

There is no particular limitation on the antioxidant and the ultraviolet absorber, as long as they are commonly used in hot melt adhesives and the objective film-wrapped type hot melt adhesive according to the present invention can be obtained.

Examples of the antioxidant include a phenol-based antioxidant, a sulfur-based antioxidant, and a phosphorus-based antioxidant.

Examples of the ultraviolet absorber include a benzotriazole-based ultraviolet absorber and a benzophenone-based ultraviolet absorber. It is also possible to add a lactone-based stabilizer. These additives can be used alone or in combination.

It is possible to use, as the stabilizer, commercially available products. Examples thereof include SUMILIZER GM (trade name), SUMILIZER TPD (trade name), and SUMILIZER TPS (trade name) manufactured by Sumitomo Chemical Industry Company Limited, IRGANOX 1010 (trade name), IRGANOX HP2225FF (trade name), IRGAFOS 168 (trade name), and IRGANOX 1520 (trade name) manufactured by Ciba Specialty Chemicals, and JF77 (trade name) manufactured by Johoku Chemical Co., Ltd. These stabilizers can be used alone or in combination.

The "fine particle filler" may be one commonly used in hot melt adhesives, and is not particularly limited as long as the objective film-wrapped type hot melt adhesive according to the present invention can be obtained. Examples of the "fine particle filler" include mica, calcium carbonate, kaolin, talc, titanium oxide, diatomaceous earth, urea-based resin, styrene beads, calcined clay, and starch. These particles preferably have a spherical shape, and there is no particular limitation on the size (diameter in the case of a spherical shape).

<Thermoplastic Film>

As used herein, the "thermoplastic film" means a film in which a thermoplastic resin composition comprising a thermoplastic resin is molded into a thin sheet shape.

The thermoplastic film is a wrapping film which surrounds a hot melt adhesive block, and heated and melted together with the hot melt adhesive block.

As used herein, the "thermoplastic resin" means a resin having properties in which it is softened by heating to become able to be molded and is solidified by cooling. The thermoplastic resin comprises an ethylene homopolymer, and may further additionally comprise a resin (macromolecule) generally called a thermoplastic resin, and is not particularly limited as long as the objective film-wrapped type hot melt adhesive according to the present invention can be obtained. Specific examples of the thermoplastic resin include nylon, polyethylene, polypropylene, polystyrene, polyvinyl chloride, ethylene-(meth)acrylate copolymer, ethylene-vinyl carboxylate copolymer, poly(meth)acrylic acid, polyester, and polyamide. One or more other polymers mentioned below can correspond to the thermoplastic resin.

As used herein, the "thermoplastic resin composition" comprises an ethylene homopolymer, may further comprise a thermoplastic resin, may comprise other additive(s), and is not particularly limited as long as the objective film-wrapped type hot melt adhesive according to the present invention can be obtained.

As used herein, the thermoplastic resin composition comprises an ethylene homopolymer.

The melting point of the ethylene homopolymer is preferably 70 to 120° C., more preferably 80 to 120° C., and particularly preferably 85 to 110° C.

When the melting point of the ethylene homopolymer is within the above range, the thermoplastic film becomes to have more improved thermal stability, becomes more hardly discolored since it is less degraded after melted, and becomes to more hardly remain in a tank.

As used herein, the "melting point" means a value measured by differential scanning calorimetry (DSC). Specifically, using DSC6220 (trade name) manufactured by SII NanoTechnology Inc., 10 mg of a sample is weighed in an aluminum container, measurement is performed at a rate of temperature increase of 5° C./min, and the resultant temperature of the top of the melting peak is referred to as melting point.

As used herein, the "ethylene homopolymer" may be a polymer obtained by homopolymerization of ethylene, and there is no particular limitation on the catalyst used for polymerization. In other words, an ethylene homopolymer polymerized by a Ziegler-Natta catalyst and an ethylene homopolymer polymerized by a metallocene catalyst also correspond to the ethylene homopolymer according to the present specification.

A thermoplastic resin composition according to an embodiment of the present invention comprises an ethylene homopolymer and may further comprise one or more other polymers. As used herein, the one or more other polymers mean polymers other than the ethylene homopolymers and can correspond to the "thermoplastic resin", and are not particularly limited as long as the objective film-wrapped type hot melt adhesive according to the present invention can be obtained. The one or more other polymers include an ethylene-based copolymer and an α-olefin polymer.

Specific examples of the "one or more other polymers" include an ethylene-based copolymer such as an ethylene-vinyl acetate copolymer (EVA), an ethylene-methyl methacrylate copolymer (EMMA), an ethylene-ethyl acrylate copolymer (EEA), an ethylene-methyl acrylate (EMA) copolymer, an ethylene-ethyl acrylate-maleic anhydride copolymer (E-EA-MAH), an ethylene-acrylic acid copolymer (EAA), an ethylene-methacrylic acid copolymer (EMAA), an ionomer of an ethylene-acrylic acid copolymer, an ionomer of an ethylene-methacrylic acid copolymer, an ethylene-propylene copolymer, an ethylene-octene copolymer, and an ethylene-butene copolymer; and an α-olefin polymer such as a propylene homopolymer and a propylene-butene copolymer (except for one corresponding to an ethylene-based copolymer).

A film-wrapped type hot melt adhesive according to an embodiment of the present invention preferably contain 50 to 100 parts by weight, more preferably 80 to 100 parts by weight, and particularly preferably 90 to 100 parts by weight of the ethylene homopolymer, based on 100 parts by weight of the total of the ethylene homopolymer and the other polymer(s). When the content of the ethylene homopolymer is within the above range, the thermoplastic film becomes to have more improved thermal stability, becomes more hardly degraded and discolored after melted, and becomes to more hardly remain in a tank. When the content of the ethylene homopolymer is 100 parts by weight, the content of the other polymer(s) becomes 0 part by weight, and a resin contained in the thermoplastic film becomes only the ethylene homopolymer.

A thermoplastic resin composition according to the present invention can comprise an additive. Examples of the additive include an antioxidant for improved stability, and other optional components, such as a lubricant, an antiblocking agent, or other a processing aid, and an antistat, a stabilizer, a plasticizer, a dye, a perfume, and a filler.

There is no particular limitation on the production method of the thermoplastic film as long as the objective film-wrapped type hot melt adhesive according to the present invention can be obtained, and examples of the production method of the thermoplastic film include a publicly known melt casting method and a melt extrusion method such as a T-die method and an inflation method.

The thickness of the thermoplastic film is preferably 10 to 500 µm in terms of the physical properties of the film. When the thickness of the thermoplastic film is 10 to 500 µm, more suitable rigidity is exerted, and thus the thermoplastic film can be produced more easily using a roll-shaped mold mentioned below, and the thermoplastic film can be produced more easily since the film-forming properties are more stabilized. The thickness of the thermoplastic film is more preferably 15 to 400 µm, still more preferably 20 to 300 µm, and particularly preferably 30 to 150 µm.

A thermoplastic film according to an embodiment of the present invention may be a monolayer film or a multi-layer film consisting of two or more layers.

The surface of the thermoplastic film is roughened and a concavo-convex is formed thereon. The concavo-convex as used herein means that a surface of an object is not flat, namely, "protuberance" and "hollow", and is not particularly limited as long as the objective film-wrapped type hot melt adhesive according to the present invention can be obtained. The "convex-concave" as used herein means one which was formed deliberately by some method.

Examples of the means for forming the concavo-convex of the thermoplastic film include blast treatment, embossing, corona treatment, and plasma treatment.

The "blast treatment" is a method in which a surface of a film is shaved to form a concavo-convex shape. Examples of the blast treatment include sandblast in which sand is applied to a surface of a film to shave the surface, scratch blast in which a surface of a film is scratched using a sharp needle, etc. to impart a concavo-convex shape, and hairline finish.

Examples of the "embossing" include a method in which a thermoplastic resin composition in a melted state is sandwiched between a mirror roll and an embossing roll, and then cooled to produce a film having a concavo-convex shape while forming a concavo-convex; and a method in which, after a melted material of a thermoplastic resin composition is molded and a film is produced, the film is sandwiched between a mirror roll and an embossing roll to be pressed, thereby forming a concavo-convex shape.

The corona treatment is a method in which corona discharge is generated by applying a high-frequency/high-voltage output supplied by a high-frequency power source between a discharge electrode and a treatment roll and then a film is passed under corona discharge, thereby reforming the surface.

The plasma treatment is a method in which, using a high-frequency power source, etc. as a trigger in vacuum, gas is excited to be in a highly reactive plasma state and then plasma is brought into contact with a film, thereby reforming the surface.

As the method for roughening the surface, blast treatment such as scratch blast and hairline finish and embossing are preferable in terms of the fact that a compact concavo-convex shape can be formed, and embossing is most preferable in consideration of blocking resistance.

A thermoplastic film according to an embodiment of the present invention can be obtained as a substantially unstretched monolayer film or laminated film by the above production method, and embossing the surface thereof is preferable.

There is no particular limitation on the method for embossing the surface (or the method for emboss processing on the surface) of the monolayer film or the laminated film, where various methods such as a pressing (or pressurizing) method which uses a metal roll (embossing roll) with a concavo-convex pattern on the surface as a cooling roll when the monolayer film or the laminated film is formed by T-die extrusion, etc., and a combination thereof can be employed. For example, a roller with diamond particles, mechanical concavo-convex processing utilizing a punching blade, laser, electron beam irradiation, plasma irradiation, and a high-pressure discharge perforation method etc. can be employed, and these can be appropriately selected considering the material of the film, thickness of the forim, transit speed, and the size of the concavo-convex etc.

It is also possible to form a concavo-convex utilizing an embossing device composed of a male die having a cylindrical protrusion and a female die equipped with a cylindrical hole. The concavo-convex may be a braille protruding outward, or a character, symbol, or mark, etc. in a concavo-convex shape.

The height of the convex portion and the depth of the concave portion vary depending on the types of the character, symbol, or mark, etc., and can be usually used in a range of 100 to 500 μm. In this case, it is permissible that the height of the convex portion and the depth of the concave portion are larger than the thickness of the film.

<Packaging of the Hot Melt Adhesive by the Thermoplastic Film>

In the present invention, there is no limitation on the method for producing a film-wrapped type hot melt adhesive wrapped by a thermoplastic film as long as the objective film-wrapped type hot melt adhesive according to the present invention, and for example, the following method can be exemplified.

A hot melt adhesive in a heated and melted state is allowed to stand at room temperature to be solidified, thereby producing a block of the hot melt adhesive. The block of the hot melt adhesive is wrapped by a thermoplastic film in which a concavo-convex is formed on the surface thereof. In this case, wrapping is performed so that the concavo-convex on the surface faces outward.

On the other hand, it may be acceptable that a heated and melted hot melt adhesive is poured on a thermoplastic film having a concavo-convex on the surface thereof and is solidified, so that a block of the hot melt adhesive is produced and simultaneously the block of the hot melt adhesive is wrapped by the thermoplastic film. Although an extremely small amount of the hot melt adhesive is melted into the thermoplastic film, the film-wrapped type hot melt adhesive can be obtained more easily. In this case, wrapping is performed so that the concavo-convex on the surface faces outward.

<Use of the Film-Wrapped Type Hot Melt Adhesive Wrapped by the Thermoplastic Film>

The film-wrapped type hot melt adhesive wrapped by the thermoplastic film is carried and/or stored in a state where plural blocks thereof are stacked. Therefore, although the film surface becomes in a contact state, the concavo-convex on the film surface decreases the adhesion area, resulting in decreased adhesiveness between films and decreased blocking properties (namely, improvement in blocking resistance).

When applied, a film-wrapped type hot melt adhesive according to an embodiment of the present invention is melted in a heating furnace (tank) in a state where it comprises a film, and applied to a substrate such as an olefin tape constituting various products such as disposable products.

There is no particular limitation on the method for coating with the film-wrapped type hot melt adhesive as long as the objective products can be obtained. Such coating methods are roughly classified into, for example, contact coating methods and non-contact coating methods. The "contact coating" methods refer to coating methods in which a discharger is brought into contact with a member or a film in the case of coating with the hot melt adhesive, while the "non-contact coating" methods refer to coating methods in which a discharger is not brought into contact with a member or a film in the case of coating with the hot melt adhesive. Examples of the contact coating methods include a slot coater coating method, a roll coater coating method and the like, and examples of the non-contact coating methods include a spiral coating capable of coating in a spiral form, an omega coating or control seam coating method capable of coating in a wavy form, a slot spray coating or curtain spray coating method capable of coating in a plane form, dot coating capable of coating in a dot form, and a bead coating capable of coating in a line form, etc.

A film-wrapped type hot melt adhesive according to an embodiment of the present invention can be used for hygiene (or sanitary) materials, disposable medical drapes, paper, tapes and labels, furniture, textiles, production of footwear, wood processing or building industry, for example, roof membranes or other building-type lamination layers.

EXAMPLES

The present invention will be described specifically and in more detail by way of Examples and Comparative Examples. These Examples are only one embodiment of the present invention, respectively, and the present invention is not limited by these Examples.

In the descriptions of the Examples, portions not considering a solvent are based on parts by weight and % by weight unless otherwise specified.

<Fabrication of Hot Melt Adhesive Block>

Components of a hot melt adhesive shown in Table 1 was melted at 150° C. and mixed to obtain the hot melt adhesive in a melted state. The hot melt adhesive was poured into a release-treated polypropylene tray. The hot melt adhesive was naturally cooled to a room temperature, thereby producing a hot melt adhesive block.

TABLE 1

| Component of hot melt adhesive | Product name | Parts by weight |
|---|---|---|
| Styrene-butadiene block copolymer | Asaprene T438, manufactured by Asahi Kasei Corporation | 20 |
| Tackifier resin | T-REZ HC-103, manufactured by JXTG Nippon Oil & Energy Corporation | 65 |
| Paraffin oil | Diana Fresia S32, manufactured by Idemitsu Kosan Co., Ltd. | 14.5 |
| Antioxidant | SUMILIZER GM, manufactured by Sumitomo Chemical Industry Company Limited | 0.2 |
| Antioxidant | SUMILIZER TPD, manufactured by Sumitomo Chemical Industry Company Limited | 0.3 |

<Thermoplastic Film>

Each of the following thermoplastic films obtained by molding each of thermoplastic resin compositions into a film shape was used.

Thermoplastic film 1: a film made from an ethylene homopolymer (PE) obtained under a Ziegler-Natta catalyst. The surface has a convex-concave.

Thermoplastic film 2: a film made from an ethylene homopolymer (PE) obtained under a Ziegler-Natta catalyst and an ethylene homopolymer (PE) obtained under a metallocene catalyst. The surface has a convex-concave.

Thermoplastic film 3: a film made from 90 parts by weight of an ethylene homopolymer (PE) obtained under a Ziegler-Natta catalyst and 10 parts by weight of ethylene-vinyl acetate (EVA) obtained under a Ziegler-Natta catalyst. The surface has a convex-concave.

Thermoplastic film 4: a film made from 90 parts by weight of an ethylene homopolymer (PE) obtained under a Ziegler-Natta catalyst and 10 parts by weight of ethylene-methacrylate (EMA) obtained under a Ziegler-Natta catalyst. The surface has a convex-concave.

Thermoplastic film 5: a film made from 90 parts by weight of an ethylene homopolymer (PE) obtained under a Ziegler-Natta catalyst and 10 parts by weight of a propylene homopolymer (PP) obtained under a metallocene catalyst. The surface has a convex-concave.

Thermoplastic film 6: a film made from an ethylene homopolymer (PE) obtained under a metallocene catalyst. The surface has a convex-concave.

Thermoplastic film 7': a film made from an ethylene homopolymer (PE) obtained under a Ziegler-Natta catalyst. The surface has no convex-concave.

Thermoplastic film 8': a film made from 90 parts by weight of an ethylene homopolymer (PE) obtained under a Ziegler-Natta catalyst and 10 parts by weight of ethylene-vinyl acetate (EVA) obtained under a Ziegler-Natta catalyst. The surface has no convex-concave.

Thermoplastic film 9': a film made from polymethacrylic acid (PMA) obtained under a Ziegler-Natta catalyst and ethylene-vinyl acetate (EVA) obtained under a Ziegler-Natta catalyst. The surface has no convex-concave.

Thermoplastic film 10': a film made from polymethacrylic acid (PMA) obtained under a Ziegler-Natta catalyst and ethylene-vinyl acetate (EVA) obtained under a Ziegler-Natta catalyst. The surface has a convex-concave.

<Measurement of Melting Point of Thermoplastic Resin>

The melting point of each thermoplastic resin was measured with DSC (DSC6220 (trade name) manufactured by SII NanoTechnology Inc.). The detailed measurement method is as already mentioned in the section of "Description of the Embodiments".

The melting point of each thermoplastic resin corresponds to the melting point of the thermoplastic resin contained in each thermoplastic film, as shown in Table 2. A thermoplastic film comprising plural thermoplastic resins can show plural melting points.

<Wrapping of Hot Melt Adhesive>

(Film-Wrapped Type Hot Melt Adhesive of Example 1)

The hot melt adhesive block was wrapped by the thermoplastic film 1, thereby producing a film-wrapped type hot melt adhesive of Example 1. The "film-wrapped type hot melt adhesive wrapped by the thermoplastic film 1" was used as the sample for evaluation of Example 1.

(Film-Wrapped Type Hot Melt Adhesives of Examples 2 to 6 and Comparative Examples 1 to 4)

Each of film-wrapped type hot melt adhesives were produced using the same method as in Example 1, except that the hot melt adhesive block was wrapped by each of the thermoplastic resin films 2 to 6 and 7' to 10' shown in Table 2, to obtain each of samples for evaluation of Examples 2 to 6 and Comparative Examples 1 to 4.

<Blocking Resistance Test>

In order to increase the adhesive force between the hot melt adhesive block and the thermoplastic film, two of each sample for evaluation (two of each film-wrapped type hot melt adhesive wrapped by the thermoplastic films 1 to 10') were allowed to stand at 60° C. for 1 hour. After 1 hour, the film surface was wiped with a wet cloth to dampen the film surface. Two samples for evaluation of each film-wrapped type hot melt adhesive were stacked on a glass plate, and further a glass plate was placed thereon. A weight of 2 kg was placed on the top glass plate, and the samples were allowed to stand at room temperature. After 48 hours, the weight was removed, and the adhesiveness between the two samples for evaluation was investigated to evaluate the blocking resistance. The evaluation criteria are as follows. The results are mentioned in Table 2.

A: Two adhered (or contacted) samples can be separated easily (can be separated by a slight force).

C: Two adhered (or contacted) samples are difficult to be separated (only a large force can separate).

<Test of Unmelted Residue in Tank>

Melting temperature of a "device for melting hot melt adhesives" comprising a tank and a hose was set at 150° C. Then, 3 kg of the hot melt adhesive block and 100 g of each of the thermoplastic films were charged in the tank. A tip of the hose was connected with the tank so as to circulate a melted material.

After confirmation that the hot melt adhesive block was melted, the hot melt adhesive was circulated between the tank and the hose for 2 days. Then, the hot melt adhesive in a melted state was pulled out from the tank, and it was confirmed whether the film remained in the tank. The evaluation criteria are as follows. The results are shown in Table 2.

AA: The melted material in the tank is uniform, and there is no residue at all.

A: The melted material in the tank is slightly ununiform, but no residue is confirmed.

B: A trace amount of residues are confirmed in the tank.

C: A large amount of film residues are confirmed in the tank.

<Thermal Stability Test>

In a glass bottle, 30 g of each of the thermoplastic films 1 to 10' was put, and the bottle was tightly closed with aluminum foil to prevent contamination with other substances. The temperature of the tightly closed bottle was kept at 170° C. in a dryer, and after 24 and 72 hours, it was confirmed whether each thermoplastic film had discoloration. The results are shown in Table 2.

A: The thermoplastic film has no discoloration.

B: The thermoplastic film was slightly discolored.

C: The thermoplastic film was discolored to brown.

A film-wrapped type hot melt adhesive according to the present invention is suitable for carrying and storage since it is excellent in blocking resistance, and it is easy to handle for applying it to a substrate since the thermal stability of the wrapping film is excellent.

The film-wrapped type hot melt adhesive according to the present invention can be utilized for various applications, such as hygiene (or sanitary) materials, paper processing, and building field.

The invention claimed is:

1. A film-wrapped hot melt adhesive, comprising:
   a film, comprising an ethylene homopolymer present in an amount of from 90 parts by weight to 100 parts by weight, inclusive, based on the total weight of the film; and
   a block of hot melt adhesive, the block of hot melt adhesive being olefin-based or thermoplastic block copolymer-based, wherein:
   the film wraps the block of hot melt adhesive and is in direct contact with the block of hot melt adhesive,
   the film has an embossed concavo-convex pattern comprising concave portions and convex portions,
   a height of the convex portions is between 100 microns and 500 microns, inclusive,
   a depth of the concave portions is between 100 microns and 500 microns, inclusive,
   a thickness of the film is between 30 and 150 microns, inclusive,
   the thickness of the film is less than the height of the convex portions and less than the depth of the concave portions, and
   the film has a melting point of from 70° C. to 120° C., wherein the melting point of the film is less than a melt processing temperature of the block of hot melt adhesive.

TABLE 2

|  | Example | | | | | | Comparative Example | | | |
| --- | --- | --- | --- | --- | --- | --- | --- | --- | --- | --- |
|  | 1 | 2 | 3 | 4 | 5 | 6 | 1 | 2 | 3 | 4 |
| Thermoplastic film | 1 | 2 | 3 | 4 | 5 | 6 | 7' | 8' | 9' | 10' |
| Concavo-convex[a] | Pres | Pres | Pres | Pres | Pres | Pres | Abs | Abs | Abs | Pres |
| Thermoplastic resin | PE | PE/PE | PE/EVA | PE/EMA | PE/PP | PE | PE | PE/EVA | PMA/EVA | PMA/EVA |
| Melting point (° C.) | 105 | 105/85 | 105/87 | 103/80 | 105/135 | 85 | 105 | 105/85 | 106/87 | 106/87 |
| Blocking resistance | A | A | A | A | A | A | C | C | C | A |
| Unmelted Residue | A | AA | B | B | B | AA | A | B | C | C |
| Thermal stability | A | A | B | B | A | A | A | B | C | C |

[a]Pres: Presence, Abs: Absence

Each of the film-wrapped type hot melt adhesives of Examples 1 to 6 had no "C" for any of blocking resistance, unmelted residue, and thermal stability, and the balance between each performance was at a satisfactory level.

On the other hand, the film-wrapped type hot melt adhesives of Comparative Examples 1 to 4 had "C" for any one of blocking resistance, unmelted residue, or thermal stability, and as a result, the balance between each performance was poor and not at an acceptable level.

INDUSTRIAL APPLICABILITY

The present invention provides a film-wrapped type hot melt adhesive wrapped by a thermoplastic film.

2. The film-wrapped hot melt adhesive of claim 1, wherein the film further comprises at least one of an ethylene-vinyl acetate copolymer, an ethylene-(meth)acrylate copolymer, or a propylene homopolymer.

3. The film-wrapped hot melt adhesive of claim 1, wherein the block of hot melt adhesive is olefin-based.

4. The film-wrapped hot melt adhesive of claim 1, wherein the block of hot melt adhesive is thermoplastic block copolymer-based.

5. The film-wrapped hot melt adhesive of claim 1, wherein the melt processing temperature of the block of hot melt adhesive is about 150° C.

* * * * *